Figure 2:
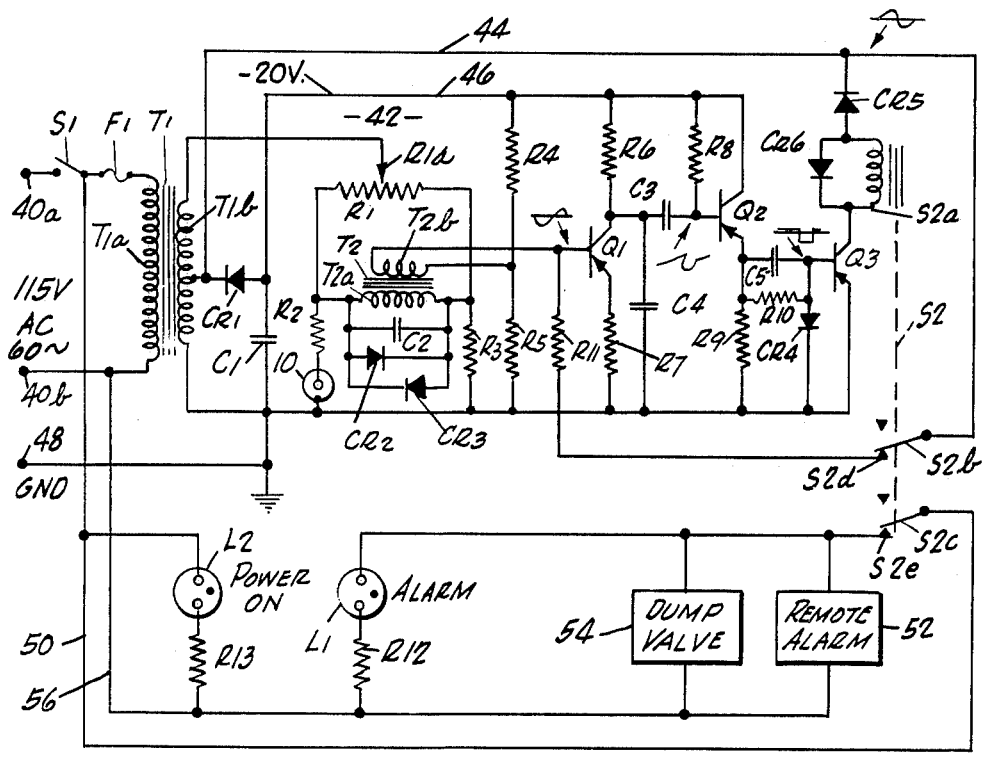

July 26, 1966　　　M. BERMAN ETAL　　　3,263,224

SALINITY MONITOR

Filed June 25, 1963

INVENTOR.
MAXWELL BERMAN
WINSLOW B. M. CLARK

BY
AGENT

United States Patent Office 3,263,224
Patented July 26, 1966

3,263,224
SALINITY MONITOR
Maxwell Berman, Los Angeles, and Winslow B. M. Clark, Van Nuys, Calif., assignors to Douglas Aircraft Company, Inc., Santa Monica, Calif.
Filed June 25, 1963, Ser. No. 290,346
9 Claims. (Cl. 340—236)

Our present invention relates generally to equipment for converting salt water to pure water and, more particularly, to a salinity monitor for monitoring the purity of the water converted by the salt water conversion equipment.

Salty or brackish water can be converted to pure water by distillation. In one form of distillation equipment, raw salt water is admitted into an evaporation chamber and heat is suitably applied to boil the raw water under a vacuum condition induced in the chamber by a jet vacuum pump. The resulting vapor, coupled with intermingling raw water particles, are drawn through separators which separate the raw water particles from the vapor. Concentrated brine and other contaminants are pumped out of the chamber through a drain line, and the vapor passes through the separators, is condensed, collected and pumped as pure water through a connecting line into a storage tank.

A probe is located in the connecting line to sense the salinity or degree of contamination of the distilled water being pumped through the line to the storage tank. The probe is part of a salinity monitor which is adjustably responsive to a selected, maximum salinity condition of the distilled water being pumped through the line as sensed by the probe, to energize a dump valve and one or more alarm devices. The dump valve is, of course, located beyond the probe in the connecting line and before the storage tank. The valve acts, when energized, to divert the water flowing in the connecting line away from the storage tank. The alarm devices may include either a visual water condition indicator lamp or an audio alarm buzzer, or both. Thus, if the salt content of the distillate exceeds that which the salinity monitor is adjusted or set for, the dump valve automatically diverts the distillate from entering the storage tank, the condition of the water is indicated and/or an alarm is sounded.

It should be apparent from the foregoing that a salinity monitor should accurately and rapidly sense the salinity or contamination condition of the distilled water flowing through the connecting line to the storage tank, in order to be able to cause the immediate diversion of the flowing water on occurrence of any sudden changes in salinity or contamination thereof. The salinity monitor should also be a reliable device which is highly sensitive at all times to the salinity or contamination level of the water in a flowing stream but is operatively unaffected by such environmental conditions as heat, vibration, shock, corrosion, etc.

The salinity or contamination level of salty or brackish water can be accurately and quickly indicated by measuring the conductivity of the water. As is well known, the conductivity of water generally increases with the amount of salts dissolved therein since the salts are normally electrolytes. Further, if any foreign matter including various minerals and earth particles are somehow able to get into the flow of distilled water, the conductivity thereof is invariably increased commensurately with the degree of such contamination. Conductivity, of course, can be instantaneously and continuously measured accurately by appropriate electrical means.

It is accordingly a major object of our invention to provide an electrically operated salinity monitor which is reliable, accurate and rapidly responsive in operation for sensing and controlling the maximum salinity or contamination level of water flowing to a storage tank.

Another object of the invention is to provide a salinity monitor which can be easily adjusted to be responsive at a selected, maximum salinity or contamination condition of water flowing to a storage tank, to cause prompt diversion of the flow of such water therefrom.

A further object of this invention is to provide an automatically operating salinity monitor which acts positively in diverting the flow of water from a storage tank when the salinity or contamination of the flowing water reaches a predetermined level, and automatically restores the flow of water to the tank when the salinity or contamination of the flowing water returns to a safe or desired level.

A still further object of our invention is to provide a probe, for an electrically operated salinity monitor, which can be directly immersed in a flow of water for sensing the conductivity thereof.

Yet another object of the invention is to provide a probe, for an electrically operated salinity monitor, having a structure which is self cleaning to avoid stagnation of collected gases or other contaminants, either solid or liquid, about the electrodes of the probe when it is immersed in a flow of water.

Briefly, and in general terms, the foregoing and other objects are preferably accomplished by providing a salinity monitor comprising a bridge circuit including a probe connected in one arm thereof, amplifying means connected to the output of the bridge circuit for controlling a relay means, and an amplifier feedback connection and valve means which are controllably energized in accordance with an unactuated condition of the relay means for respectively eliminating relay contact chatter and suitably diverting a flow of water in which the probe is immersed.

The probe senses the conductivity of the flowing water and thus measures the salinity or contamination level thereof. The bridge can be adjusted to respond with a change in output when conductivity and hence salinity or contamination of the flowing water, as detected by the probe, reaches or exceeds a predetermined level. The changed output signal from the bridge is amplified by the amplifying means, and causes the relay means to assume the unactuated condition which energizes the feedback connection for eliminating relay contact chatter and energizes the valve means for diverting the flow of water from its normal path.

When the conductivity or salinity or contamination of the flowing water drops appropriately below the predetermined salinity or contamination level, the bridge again responds with a change in output back to its former condition. This changed output signal is amplified and causes the relay means to be actuated such that the feedback connection and the valve means are de-energized. De-energization of the feedback connection for a bridge output signal corresponding to a salinity condition of the flowing water below the predetermined level produces an amplified bridge output signal which actuates the relay means without any attendant relay contact chatter. De-energization of the valve means returns the flow of water in which the probe is immersed back to its normal path.

The probe structure has a coaxial electrode configuration which is longitudinally positioned centrally in a normally vertical inlet portion of the housing of the probe, so that it extends in a direction against an upward flow of water into the inlet portion of the housing. The housing has a normally horizontal outlet portion some distance above the lower end of the coaxial electrode configuration, making a generally right angular bend with the inlet portion. By having a rising flow of water, the normal collection of water at low pockets away from the electrodes and causing an air pocket or bubbling at the probe is avoided. The central, flow-opposing position of the coaxial electrode structure coupled with the turbulence created by the right angular bend of the housing materially and effectively assure full and continuous contact of the electrodes with the flowing water, keep the electrodes clean, and eliminate stagnation of generated gases or other contaminants thereon from all sides.

Suitable alarm or indicating devices are also preferably provided and energized with the energization of the valve means. Such devices can include an indicator lamp for visually indicating the condition of the flow of water which is being monitored, and an alarm buzzer for providing a more noticeable audio indication of an excessive salinity condition of the water.

Figure 1:
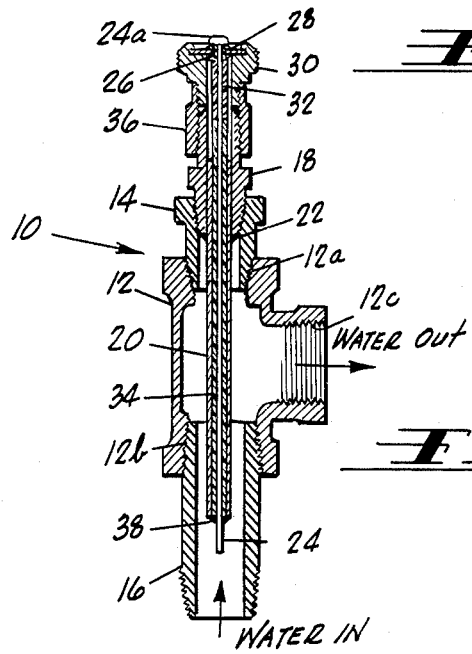

Our invention will be more fully understood, and other objects and advantages thereof will become apparent from the following detailed description of an illustrative embodiment of the invention, such description to be taken in connection with the attached drawing, in which:

FIGURE 1 is a central, sectional view of a probe structure used in our salinity monitor; and FIGURE 2 is a circuit diagram of the salinity monitoring system.

FIGURE 1 shows a central longitudinal sectional view of a probe 10 which is used in our salinity monitor. The probe construction illustrated in FIGURE 1 is, of course, only exemplary of one form of construction of the probe 10. The probe structure is generally symmetrical, and the probe 10 is normally located in a connecting line carrying, for example, pure water which is being pumped through the line to a storage tank. The probe 10 senses the conductivity or salinity of the water flowing through the line to the storage tank. The proble 10 is, of course, part of a salinity monitor which can be adjusted to respond to an excessive salinity condition of the flowing water at or above a predetermined contamination level as sensed by the probe 10, to energize a dump valve and one or more alarm devices. When the valve is energized, it acts to divert the water flowing in the connecting line away from the storage tank. This condition is, of course, indicated by the alarm devices.

The probe 10 includes a T 12 forming part of the housing for the probe as shown in FIGURE 1. The T 12 has upper, lower and side threaded openings 12a, 12b, and 12c respectively. A bushing reducer 14 is threaded into the upper opening 12a of the T 12, and a nipple 16 is threaded into the lower opening 12b. It should be noted that standard parts which are readily available commercially are utilized in the construction of the probe 10. The construction shown in FIGURE 1 can, of course, be simplified by using specially fabricated parts. However, the construction of the probe 10 shown in FIGURE 1 includes all of the advantages that a specially made probe would have functionally. The T 12 is, for example, a brass connector for ¼ inch pipe. The bushing reducer 14 is also a brass connector for connecting ⅛ inch pipe to ¼ inch pipe, and the nipple 16 is a 1.5 inch long, ¼ inch plastic pipe. Plastic or other non-conducting material is used for the nipple to reduce or eliminate any plating action on the probe's center conductor (24) from the inner wall of nipple 16.

Nipple 18 is threaded into the bushing reducer 14 as shown in FIGURE 1 and, in this instance, can be made of stainless steel. The nipple 18 fixedly mounts a tubular electrode 20 which is, for example, silver soldered to the nipple 18 at its lower edge 22. The tubular electrode 20 can also be fabricated, in this instance, from a stainless steel annealed tube ³⁄₁₆ inch O.D. x .028 inch wall x 2⅝ inches long. The tubular electrode 20 is concentrically disposed about an inner, central, wire electrode 24. The lower end of the wire electrode 24 extends, for example, approximately .25 inch below the lower edge of the outer tubular electrode 20.

The upper end of the wire electrode 24 passes through an eyelet 26 which is supported by a fixed insulator disc 28 centrally near the top of an electrical connector 30. A head 24a is suitably formed at the upper end of the wire electrode 24 and serves as a central electrical contact of the connector 30. An insulator tube 32 is placed over the wire electrode 24 and located near the top of the wire electrode 24 within the central bore of the connector 30, as indicated in FIGURE 1. The insulator tube 32, is for example, a Teflon tube ⅛ inch O.D. x .022 inch wall x ½ inch long. The wire electrode 24 is wound below the insulator tube 32 with insulating (vinyl) tape 34 which is wrapped around the wire electrode 24 down to a point that would extend below the lower edge of tubular electrode 20 when the wire electrode 24 is properly positioned in the tubular electrode 20 as illustrated in FIGURE 1.

The electrical connector 30 including its mounted wire electrode 24 having insulator tube 32 and insulating tape 34 thereon, is threadedly attached to coupling nut 36 which is, in turn, threaded onto the nipple 18 with the insulating tape wrapped portion of the wire electrode 24 inserted into the tubular electrode 20 as shown in FIGURE 1. Before the nipple 18 is threaded into the bushing reducer 14, the insulating tape 34 is trimmed to be flush with the lower edge of the tubular electrode 20, and a waterproof seal 38 is provided between the end of the tubular electrode 20 and the cylindrical surface of the wire electrode 24 near the end of the tubular electrode 20 as shown in FIGURE 1. Silicon rubber, for example, can be used to make a waterproof seal which prevents water from entering the end of the tubular electrode 20 into the insulating tape wrapped portion of the wire electrode 24 and remaining in that space between the two electrodes. The tubular electrode 20 is normally connected through the intervening conductive parts to a ground connection.

With a probe structure of the configuration shown in FIGURE 1, water enters the lower opening of the nipple 16 up around the electrodes 20 and 24 into the T 12 and then makes a right angular turn out the opening 12c. It can be seen that the water flows past the electrodes 20 and 24, rising well above the effective portions of the electrodes 20 and 24 before it reaches a level which permits the water to flow out of the normally horizontal opening 12c. Maximum velocity of the water is also obtained by use of a nipple 16 having a relatively small internal diameter. By locating the effective portions of the electrodes 20 and 24 centrally and longitudinally in opposition to the direction of the flow of water with the nipple 16, an arrangement is obtained which thoroughly cleans the effective portions of the electrodes 20 and 24 of collections such as gas thereon. At the same time, the effective portions of the electrodes 20 and 24 are fully and continuously immersed in a flow of water which must make a right angular turn in order to leave the probe 10.

By having the water enter the probe 10 in a rising fashion, the effective portions of the electrodes 20 and 24 are assured of being in full contact with the water, and this condition is maintained and encouraged by the right angular bend or change in direction produced in the flow of water by the T 12. The T 12 produces some turbulence in the flow of water above the effective electrode portions, which aids the directional change of water flow in maintaining full and complete contact of the effective portions of the electrodes 20 and 24 with the water by eliminating any water deficiencies about the electrodes that may create air pockets. Such deficiencies of water about the effective portions of the electrodes 20 and 24 may also occur if the water were to flow in a downward direction but which is avoided by having the water flow upwardly. Thus, it is desirable that the water flows in an upward direction against a central, longitudinal orientation of the probe electrodes. It is also desirable that the effective portions of the electrodes be located in an area of maximum flow velocity, and that a bend in the flow direction is provided at a point somewhat above the effective portions of the probe electrodes 20 and 24.

While the probe 10 is not absolutely restricted to its orientation as shown in FIGURE 1 or to the indicated direction of water flow so long as an adequate water flow is maintained, it is preferred that vertical orientation of the probe 10 and a direction of water flow as indicated in FIGURE 1 be maintained in order to realize the most dependable and accurate operation thereof. Irrespective of the orientation of the probe 10 or the direction of water flow through the housing thereof, the water which flows out of the probe structure can then be directed to flow through a controlling dump valve to a storage tank as described above.

FIGURE 2 shows a circuit diagram of a salinity monitoring system according to our invention, and which preferably includes the use of the probe 10 shown in FIGURE 1. The circuit diagram of FIGURE 2 also shows the dump valve and alarm devices which are controlled by the salinity monitor. Alternating power, for example, 115 volts at 60 c.p.s. is applied to terminals 40a and 40b. The terminal 40a is connected to terminal 40b by the series connected elements including switch S1, fuse F1 and the primary winding T1a of a transformer T1. The secondary winding T1b of the transformer T1 is connected across the ends of a bridge circuit 42.

The secondary winding T1b of the transformer T1 has a center tap which is connected to a lead 44 and to another lead 46 through a negatively oriented diode CR1. The anode of the diode CR1 is connected to ground through a filter capacitor C1, and the ground connection is also connected to a ground terminal 48 as shown in FIGURE 2. One side of the transformer secondary winding T1b is connected to one end of the bridge circuit 42 through the wiper R1a of potentiometer R1 which is connected to form the upper two arms of the bridge circuit 42. The other side of the transformer secondary winding T1b is connected to ground and other end of bridge circuit 42. The transformer T1 is a step-down transformer and provides, for example, 40 volts across the ends of the bridge circuit 42 and, of course, 20 volts on the lead 44 which is taken across the lower half of the transformer secondary winding T1b. The diode CR1 is a half wave rectifier and the capacitor C1 is a supply filter for providing a direct voltage of −20 volts on the lead 46.

The probe 10 is connected in series with a resistor R2 and together form the left lower arm of the bridge circuit 42. Resistor R3 forms the right lower arm of the bridge circuit 42. The primary winding T2a of a transformer T2 is connected across the centers of the bridge circuit 42 as shown in FIGURE 2. Also connected in parallel with the primary winding T2a of the transformer T2 are phase shift capacitor C2 and the oppositely oriented diodes CR2 and CR3. The output of the bridge circuit 42 is obtained from the secondary winding T2b of the transformer T2. One end of the secondary winding T2b is connected to the common junction between two series connected resistors R4 and R5 which are connected respectively to the lead 46 and ground. The other end of the secondary winding T2b is connected to the base of a transistor Q1.

The collector of the transistor Q1 is connected to lead 46 through resistor R6 and the emitter is connected to ground through a resistor R7. The collector of the transistor Q1 is connected to the base of transistor Q2 through a coupling capacitor C3. The collector of the transistor Q1 is also connected to ground through a filter capacitor C4. The lead 46 is connected directly to the collector of the transistor Q2 and also to its base through a bias resistor R8. The emitter of the transistor Q2 is connected to ground through a resistor R9. The transistor Q1 is connected as a common emitter amplifier and the transistor Q2 is connected as an emitter follower.

The output of the emitter follower Q2 is applied to the base of a power transistor Q3 through a coupling capacitor C5 which is shunted by resistor R10. The base of the power transistor Q3 is also connected to ground through a positively oriented diode CR4. The lead 44 is connected to one end of the control coil S2a of relay S2 through a negatively oriented diode CR5, and the other end of the control coil S2a is connected to the collector of the power transistor Q3. The emitter of transistor Q3 is connected to ground, and shunting the relay control coil S2a is an energy absorbing diode CR6.

The relay S2 is a double pole, double throw relay including poles S2b and S2c which normally engage the relay contacts S2d and S2e, respectively. The relay pole S2b is connected to the lead 44 and the relay contact S2d is connected to the base of the transistor Q1 through the feedback resistor R11. The relay pole S2c is connected to the arm of the switch S1 through lead 50, and the relay contact S2e is connected to one side of a remote alarm device 52 and a dump valve 54. The other sides of the remote alarm device 52 and dump valve 54 are connected to the input terminal 40b through lead 56. The relay contact S2e is also connected to one electrode of an alarm device which can be an indicator lamp L1, the other electrode of which is connected to the lead 56 through a resistor R12. Power indicator lamp L2 is also provided for the salinity monitor, and one electrode of the lamp L2 is connected to lead 50 and the other electrode of the lamp L2 is connected to the lead 56 through resistor R13.

In operation, it is assumed that the wiper R1a of the potentiometer R1 in the bridge circuit 42 has been adjusted so that the bridge circuit 42 will be unbalanced from one direction to another when the probe 10 senses a predetermined conductivity or salinity level or greater of the water flowing through the probe structure. Thus, when the switch S1 is closed, the transformer T1 will provide alternating power across the ends of the bridge circuit 42, lower alternating power to the lead 44 and direct power to the lead 46. If the salinity level of the water flowing through the probe structure is below the predetermined level set by the potentiometer R2, the transformer T2 will provide an output signal to the base transistor Q1 having a phase as indicated by the sinusoidal curve shown near the base of the transistor Q1 and which is opposite in phase to the reference signal on the lead 44 as illustrated by the sinusoidal curve located near the lead 44.

For large conditions of unbalance of the bridge circuit 42, the diodes CR2 and CR3 act to clip the peaks of the sinusoidal signal appearing across the centers of the bridge circuit 42 so that a more squared wave form would be provided to the base of the transistor Q1. The resistors R4 and R5 establish the operating point of the transistor Q1 which would conduct, charging the capacitor C3, until the base of transistor Q1 becomes sufficiently positive to cut off the transistor Q1. The base potential of the transistor Q2 will then drop negatively as indicated by the curve shown near the base thereof.

The output of the emitter follower Q2 is supplied to the base of the power transmitter Q3 through the parallel combination of the capacitor C5 and resistor R10. The capacitor C5 is rapidly discharged through the diode CR4 when the diode is forward-biased. However, when the diode CR4 is reversed-biased as when the base of the power transistor Q3 is negative and the capacitor C5 is being charged through the transistor Q2, the diode CR4 acts as a high resistance which prevents the shunting of signal current from the power transistor Q3. The resistor R10 shunting the capacitor C5 helps discharge the capacitor C5 and increases the signal to the base of the power transistor Q3.

When the base of the power transistor Q3 is negative, the transistor Q3 will conduct if the cathode of the diode CR5 is then negative. Thus, the relay control coil S2a will be energized to actuate the relay poles S2b and S2c away from their respective contacts S2d and S2e. The relay S2 is an alternating current type relay with a built-in very small time delay in the form of a shorted turn so that it remains actuated with no chatter or hum even though the power transistor Q3 does not conduct during the first part of each cycle. When the relay pole S2c is actuated, the input supply power on lead 50 is removed from the remote alarm device 52, dump valve 54 and the alarm indicator lamp L1. Accordingly, no alarm is produced and the water flowing through the probe structure will not be diverted by the dump valve 54 from the storage tank provided therefor. Also, when the relay coil S2a is energized, the feedback signal on lead 44 is removed from the base of transistor Q1. The effect and purpose of this will be discussed later.

If the conductivity or salinity of the water flowing through the probe structure should increase to the predetermined level when a null condition of the bridge circuit 42 is reached, the output thereof is approximately zero to the transistor QE and the output of the transistor Q2 is also substantially zero which causes non-conduction of the power transistor Q3. The relay control coil S2a will not be energized and the relay S2 assumes its normal condition wherein the relay poles S2b and S2c engage their respective contacts S2d and S2e as illustrated in FIGURE 2. When this happens, the reference signal on lead 44 is then applied to the base of the transistor Q1 through the feedback resistor R11.

It can be seen that the phase of the reference signal on lead 44 is opposite to that which causes energization and actuation of the relay S2. As a result of this, the phases of the signals at the bases of the transistors Q2 and Q3 are, of course, each reversed by 180 degrees with the reversal in phase of the signal formerly appearing on the base of the transistor Q1. This prevents energization of the relay coil S2a so that there is no relay contact chatter which might be caused by a border line signal. When the relay pole S2c engages the contact S2e, the remote alarm device 52, dump valve 54 and alarm indicator lamp L1 are energized so that alarm is provided together with diversion of impure water by the energized dump valve 54 from the storage tank.

If the conductivity or salinity of the water passing through the probe is further increased beyond that valve which causes a null of the bridge circuit 42, the output signal from the bridge circuit appearing on the base of transistor Q1 will be the same as described above for the "clean" water condition but, of course, is 180 degrees reversed in phase. The signals then appearing on the bases of transistors Q2 and Q3 will also be 180 degrees reversed in phase so that the relay will not be energized. The feedback signal from lead 44 is now in phase with the bridge output signal and therefore aids in keeping the relay coil de-energized.

After the purity of the water flowing through the probe structure has been corrected and restored to a necessary degree, the bridge circuit 42 will become unbalanced again in its previous condition which was opposite to the direction of unbalance for a high conductivity or salinity condition of the water flowing through the probe structure. The phase of the output signal from the transformer T2 will be opposite to that of the signal on lead 44, which is applied to the base of the transistor Q1 through the feedback resistor R11. When the purity of the monitor water is sufficiently high, the output signal of the bridge circuit 42 overcomes that of the reference signal feedback through resistor R11 such that the original conducting conditions of the transistors Q2 and Q3 generally indicated by the wave forms shown near the bases thereof are initiated. The relay coil S2a is again energized and the relay S2 will be actuated.

Of course, when the relay S2 is actuated, the pole S2b is moved away from the contact S2d so that the reference signal on lead 44 is removed from the base of the transistor Q1 and this opposing signal will not be available to act against the action of the output signal from the transformer T2. Thus, the energization of the relay coil S2a will be significantly increased to eliminate relay contact chatter immediately following initial actuation of the relay S2. At the same time, the relay pole S2c is moved away from the contact S2e so that the remote alarm device 52, dump valve 54 and alarm indicator lamp L1 are all deenergized. When this happens, the dump valve 54 is returned to its normal position which allows the water flowing from the probe 10 to pass the dump valve 54 into the storage tank.

It is noted that the oppositely oriented diodes CR2 and CR3 connected in parallel with the primary winding T2a of the transformer T2 are desirable to prevent incorrect control of the relay S2. For example, when the bridge circuit 42 is excessively unbalanced in either direction such that a very large signal appears across the primary winding T2a of the transformer T2, then in the absence of the diodes CR2 and CR3, the large output signal from the transformer T2 produces distortion in the circuitry such that the signal at the base of the power transistor Q3 is shifted in phase enough to produce erroneous operation of the relay S2.

It is also noted that the capacitor C2 is included in the circuitry of bridge 42 to compensate for the slight phase shift of the bridge output signal caused by the capacitance introduced by the probe connected in the lower left arm of the bridge 42, by the water between the electrodes of the probe.

A highly satisfactory salinity monitor was obtained with the following types and values of components which are correspondingly identified in the circuit diagram of FIGURE 2. This listing is, of course, not intended to limit or restrict the breadth and scope of our invention.

| | |
|---|---|
| C1 | 100 mfd. |
| C2 | .47 mfd. |
| C3 | 10 mfd. |
| C4 | .68 mfd. |
| C5 | 75 mfd. |
| CR1 | 1N538. |
| CR2 | 1N462. |
| CR3 | 1N462. |
| CR4 | 1N538. |
| CR5 | 1N538. |
| CR6 | 1N538. |
| F1 | .25 amp. |
| L1 | NE51H. |
| L2 | NE51H. |
| Q1 | T1376. |
| Q2 | T1376. |
| Q3 | 2N234A. |
| R1 | 25K ohms. |
| R2 | 10K ohms. |
| R3 | 15K ohms. |
| R4 | 100K ohms. |
| R5 | 1K ohm. |
| R6 | 10K ohms. |
| R7 | 33 ohms. |
| R8 | 39K ohms. |
| R9 | 3.3K ohms. |
| R10 | 1.5K ohms. |
| R11 | 750K ohms. |
| R12 | 18K ohms. |
| R13 | 18K ohms. |
| S2 | Potter & Brumfield KA11AY, 6 v. A.C. DPDT. |
| T1 | Triad F90X. |
| T2 | UTC-SS08. |

A novel and useful salinity monitor which is accurate and reliable in operation is thus provided. An unique probe structure assures continuously clean electrodes which are fully immersed and in constant contact with flowing water to sense the conductivity and hence the salinity or contamination thereof with extreme accuracy. A relay is also controlled in the salinity monitor according to a predetermined salinity condition of the flowing water which is being monitored by the probe. The predetermined salinity level at which the salinity monitor responds in controlling the relay can be easily adjusted, and the relay is positively controlled without any contact chatter.

While various dimensions and specific types and values of components have been given in the foregoing description, it is to be understood that these are provided as examples only, and that the particular embodiment of the invention described above and shown in the drawing is merely illustrative of and not restrictive on our broad invention, and that various changes in design, structure and arrangement may be made in the disclosed embodiment of the invention without departing from the spirit and scope of the appended claims.

We claim:

1. A salinity monitor, comprising:
    a bridge circuit including a probe adapted to sense the conductivity of a fluid, said bridge circuit being unbalanced in first and second directions according to the conductivity of said fluid being respectively below and above a predetermined level of conductivity, and producing a bridge output signal having a first phase condition when said bridge circuit is unbalanced in said first direction and a second phase condition when said bridge circuit is unbalanced in said second direction;
    means for amplifying said bridge output signal; and
    relay means connected to said amplifying means and responsively actuated in a first condition for an amplified bridge output signal of said first phase condition and in a second condition for an amplified bridge output signal of said second phase condition, said relay means applying a reference signal of said second phase condition to said amplifying means when actuated in said first condition for vectorial combination with said bridge output signal whereby said reference signal can oppose said bridge output signal of said first phase condition and aid said bridge output signal of said second phase condition.

2. A salinity monitor as defined in claim 1 wherein said bridge circuit includes a Wheatstone bridge having a transformer output in which a primary winding is connected between the centers of said Wheatstone bridge, and signal limiting means is connected across said primary winding to prevent erroneous actuation of said relay means.

3. A salinity monitor as defined in claim 1 wherein said probe includes a pair of electrodes arranged in a coaxial configuration and having a portion of each electrode immersed in said fluid.

4. A salinity monitor as defined in claim 1 wherein said amplifying means includes a signal amplifier having an input to which is applied said bridge output signal and an output, and a power amplifier operatively supplied by said reference signal of said second phase condition and connected to the output of said signal amplifier for controlling said relay means according to the phase condition of the amplified output signal therefrom as referred to the phase condition of said reference signal.

5. A salinity monitor as defined in claim 1 wherein said relay means energizes an alarm device, when actuated in said second condition, whereby a warning is provided to indicate an excessive salinity level of said fluid.

6. A salinity monitor, comprising:
    a Wheatstone bridge having a first signal of a reference phase condition applied across the ends thereof and providing a bridge output signal across the centers thereof, said bridge including a probe in one arm thereof and adapted to sense the conductivity of a fluid and said bridge output signal having a first phase condition when said bridge is unbalanced in a first direction corresponding to a conductivity level of said fluid below a predetermined level and a second phase condition when said bridge is unbalanced in a second direction corresponding to a conductivity level of said fluid above the predetermined level;
    a signal amplifier including an input to which is applied said bridge output signal, and an output;
    a power amplifier connected to the output of said signal amplifier;
    a relay means connected to said power amplifier and responsively actuated in a first condition for an amplified bridge output signal of said first phase condition and in a second condition for an amplified bridge output signal of said second phase condition; and
    means for applying a second signal of said reference phase condition to the input of said signal amplifier when said relay means is actuated in said first condition for vectorial combination with said bridge output signal whereby said relay means can be actuated quickly and surely between said first and second conditions.

7. A salinity monitor as defined in claim 6 wherein said bridge includes a transformer having a primary winding connected across the centers of said bridge, and first and second signal limiting diodes of opposite orientations are connected in parallel with said primary winding to prevent erroneous actuation of said relay means.

8. A salinity monitor as defined in claim 6 wherein said probe includes a housing having a bend therein between a normally lower inlet and a normally upper outlet, and a pair of electrodes arranged in a coaxial configuration which is longitudinally positioned in said lower inlet whereby the ends of said electrodes oppose a flow of said fluid passing through said housing.

9. A salinity monitor as defined in claim 8 wherein said relay means energizes a control device, when actuated in said second condition, whereby said fluid flowing through said housing is diverted from its normal path to a storage tank because of an excessive salinity level of said fluid.

References Cited by the Examiner

UNITED STATES PATENTS

| | | | |
|---|---|---|---|
| 2,525,754 | 10/1950 | Albrecht | 324—30 |
| 2,798,215 | 7/1957 | Domingo et al. | 340—239 |
| 3,201,685 | 9/1965 | Meyer | 324—30 |

NEIL C. READ, *Primary Examiner.*

D. K. MYER, *Assistant Examiner.*